Patented June 28, 1938

2,122,122

UNITED STATES PATENT OFFICE 2,122,122

WATER SOFTENER

Willard H. Woodstock, Chicago Heights, Ill., assignor to Victor Chemical Works, a corporation of Illinois No Drawing. Application November 25, 1935, Serial No. 51,544

17 Claims. (Cl. 210—23)

This invention relates to a water softening compound, and more particularly to a phosphoric oxide-nitrogen complex having high calcium ion repressing properties.

Certain water softeners are now known which have the property of producing a water solution soft to soap, in spite of the presence of calcium, the best known of which at the present time is sodium metaphosphate. In accordance with this invention, an ammonia-phosphorus pentoxide complex is produced which has calcium ion repression properties considerably in excess of those possessed by sodium metaphosphate.

In producing a complex, anhydrous liquid or gaseous ammonia is caused to react with $P_2O_5$, preferably at temperatures below 150° C., and the resulting reaction product is then heated in the presence of ammonia for a considerable period of time at a temperature above 150° C. As a result of this treatment, a nitrogen-phosphorus pentoxide complex is produced which is extremely valuable as a water softener and which has the specific property of holding calcium and magnesium ions of normally hard waters in solution or colloidal suspension in the presence of fatty acid soap solutions.

For the purpose of measuring calcium ion repression, a suitable standard is the amount of repressing agent required to hold a definite quantity of calcium in solution when tested with a standard soap solution. Throughout this specification the repression requirement will be stated in terms of the number of cubic centimeters of a solution equivalent to 10% of the repressing agent which are required to hold 10 milligrams of calcium in solution in 50 cc. of water when tested with 0.5 cc. of standard soap solution (as defined in Standard Methods of Water Analysis) after rendering the test solution slightly alkaline to phenol-phthalein (pH approximately 8.5). In carrying out this test, the calcium is not considered held in solution unless a lather is produced which will last for a period of five minutes. Soft water is normally considered to be water containing not more than 5 parts per million of calcium.

On the basis of these tests the best previously known repressing agent was sodium hexametaphosphate, which has a repression requirement of from 1.6 to 1.7 cc. The present product has a much lower requirement, being in general less than 1.25 cc.

The product produced by reacting ammonia and $P_2O_5$ at ordinary temperatures had very little power as a calcium ion repressant, but when the reaction is then carried on above temperatures of 150° C. a further reaction occurs, apparently in the nature of a condensation and polymerization which produces a complex of high calcium repression power.

The reaction may be carried out in several different ways. For example, ammonia gas may be passed into solid $P_2O_5$ under vigorous agitation at ordinary temperatures. The resulting compound is heated for several hours at a temperature above 150° C. in the continued presence of ammonia gas. About one-half to two-thirds of the total ammonia is preferably introduced before the temperature is raised above 150° C.

Liquid ammonia may be substituted for the gas. Likewise, the reaction may be carried out by suspending $P_2O_5$ in an inert dispersing medium such as a mineral oil, to which dispersion the gaseous or liquid ammonia is added while agitating the heated dispersion. When using the liquid dispersion method, the product, a finely divided solid material, is readily separated from the dispersion medium by filtration.

As an example of the process, dry phosphorus pentoxide was slurried into an inert high-boiling paraffin oil and gaseous ammonia passed into the vigorously stirred mixture while the temperature was gradually raised to a maximum of 200° C. For instance, a three-necked reaction chamber equipped with a mechanical stirrer was filled to about two-thirds full of paraffin oil and heated, for example, by an oil bath. About one-sixth part by weight of $P_2O_5$ was added and dispersed in the oil. Ammonia gas was then slowly bubbled in and the temperature raised from room temperature to 150° C. over a period of one and one-half hours and was maintained at this temperature for two hours.

A sample taken out at this point, and filtered and washed, had a repression power about equal to that of sodium hexametaphosphate. The temperature of the reaction mixture was then raised to 200° C. and maintained there for about two hours, after which the product was separated from the oil by filtration. The final product appeared to be more highly polymerized than that taken at 150° C. and had a repression power about 70% greater than the metaphosphate. It differed greatly in physical and chemical properties from the low temperature product. The latter was quite hygroscopic and contained a higher ratio of nitrogen to phosphorus than the final product. The high temperature product, on the other hand, was substantially non-hygroscopic and had a low ratio of nitrogen to phosphorus.

The nature of the reaction between the ammonia and phosphorus pentoxide is not understood. It is possible that a product is initially formed having the formula

I

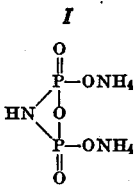

or

II

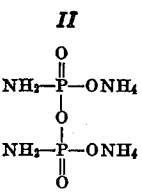

Product II may lose one molecule of ammonia to form Product I, or two molecules of Product II may condense, losing two molecules of ammonia to form a product of the following type formula:

III

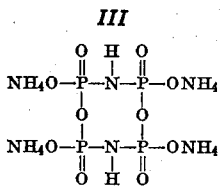

Product III has a ratio of nitrogen to phosphorus of one and one-half to one, and this is borne out by analysis of the product obtained at 150° C. without prolonged heating.

Heating of these intermediate products above 150° C. for an appreciable time apparently causes a condensation with loss of ammonia and polymerization to produce final reaction products having nitrogen-phosphorus ratios below 1.5.

Those products with a nitrogen to phosphorus atomic ratio not substantially above 1.25 are preferred for water softening purposes, and particularly those having a ratio of 1.2 or less.

As the ratio of nitrogen to phosphorus decreases, the ratio of ammonia nitrogen to total nitrogen increases, indicating that condensation with loss of nuclear nitrogen takes place. This ratio of ammonia to total nitrogen also affects the hygroscopicity of the product. Ratios above 0.8 in general produce the most satisfactory non-hygroscopic products, although ratios as low as 0.6 may give satisfactory calcium repression. Compounds with such low ratios may have the same acidity as some with higher ratios. This would indicate that the difference in ratio is due to a change in the structure of the molecule.

The products having high calcium repression power also appear to be polymerized, inasmuch as on standing in hot water there is eventually a decline in the repression power with little change in pH. This change, however, is not nearly as rapid as in the case of sodium hexametaphosphate which rapidly changes both in pH and in repressing power. A further indication of polymerization is that products have been obtained after short heating with the same molecular ratios as those obtained after long heating, but without as high calcium repression power.

As a preferred example of the invention, dry, powdered phosphorus pentoxide is thoroughly dispersed in a large volume of an inert liquid, suitably a high boiling mineral oil such as paraffin oil. The dispersed phosphorus pentoxide is then heated to a temperature of about 100° C. and dry ammonia gas rapidly passed into the mixture under vigorous agitation until the mixture has become too thick to stir properly. At this stage, the rate of ammonia addition is reduced to about one-third of the original rate. Thickening of the charge, however, may be avoided by adding the ammonia at room temperature or by adding it very slowly. The thickening, however, has a beneficial effect in general, because it causes greater dispersion of the $P_2O_5$ and increases the efficiency of the ammonia absorption. Normally the thickening stage is reached after about five minutes.

The temperature is thereafter gradually raised to approximately 150° C. and maintained at this point until the charge has thinned sufficiently to permit a high rate of ammonia addition. After about one-half to two-thirds of the ammonia required in the final product has been added, the temperature is gradually raised to about 175 to 200° C., while continuing the addition of ammonia. This temperature is maintained until the absorption of ammonia ceases, and until the product has the desired water softening properties. The ammonia may, if desired, be all introduced in this method, before heating above 150° C.

A check upon the end point of the reaction may be obtained by testing the acidity of samples taken out at regular intervals. When the titration of a one gram sample requires less than 5 cc. of $\frac{1}{10}$ normal caustic soda, the reaction is considered to have reached the desired point. Normally, this requires a heating period of from one to three hours at a temperature above 150° C.

The resulting product is a tan to white colored powder suspended in the oil reaction medium, and may be filtered therefrom, washed with a volatile oil solvent, such as ligroin or ether to remove the residual oil, and then heated to a temperature sufficient to vaporize the residual washing solvent.

If the heating of the reaction mass is carried forward, a substantially water insoluble powder may be produced, which, however, does have high calcium ion repressing power within the limits of its solubility.

The preferred product produced by the above described process is a powder, soluble in water, and substantially non-hygroscopic. It is substantially free-flowing, and normally has a pH value between 6 and 7 in 0.25% solution. It contains both ammonium and nuclear nitrogen, with the ammonium nitrogen representing at least 60% but preferably above 80% of the total nitrogen. The mol ratio of total nitrogen to phosphorus is preferably less than 1.25, and the product preferably has a calcium and magnesium repression value less than 1.2 cc.

The product is effective at any range of pH as a water softener above its normal pH of 6 to 7 and therefore is of great advantage for use in alkaline cleaning solutions and washing compounds. Sodium metaphosphate, which is the only other effective calcium ion repressant, requires pH ranges of approximately 8 to 8.5 for maximum efficiency and therefore the present product has a very decided superiority in this respect. The present product also is much more stable in aqueous solution at high temperatures than the metaphosphate.

Salts of the herein described composition may also be obtained, such as sodium and other alkaline metal salts, and have equivalent calcium repressant values.

When carrying out the process on dry (undispersed) $P_2O_5$, it has been found generally undesirable to continue heating the dry reaction product past the point of complete absorption of ammonia as determined by the titration with caustic soda, as further treating tends to fuse the product.

"Nuclear nitrogen", as used herein, means nitrogen incapable of being liberated with caustic solution in the manner of true ammonium nitrogen.

The compounds of the present invention may be defined as salts of a phosphoric oxide-nitrogen acid radical, in which the nitrogen is so bound to the phosphorus that it is not displaced by caustic soda solution in the manner of true ammonium nitrogen. The primary compound produced is the ammonium salt of this acid radical. For the sake of simplicity, the compounds have, in general, in the claims been defined in terms of the ammonium salt, and the atomic ratio of nitrogen to phosphorus and of ammonium nitrogen to total nitrogen has been calculated on the basis of the ammonium salt. Obviously, when other salts are used, all non-nitrogenous cations are included in the nitrogen total, and are of course multiplied by the atomic valences of the cations. Thus, with the sodium salt, the sodium having a valence of 1, all sodium atoms are treated as nitrogen atoms. A bi-valent metal would be treated as equivalent to two nitrogen atoms.

Similar calculations are employed in determining the ratio of ammonium nitrogen to total nitrogen.

The foregoing detailed description has been given for clearness of understanding only, and no unnecessary limitations should be understood therefrom, but the appended claims should be construed as broadly as permissible, in view of the prior art.

I claim:

1. The method of producing a nitrogen-phosphorus complex which comprises reacting anhydrous ammonia with phosphorus pentoxide and heating the reaction mixture in the presence of excess anhydrous ammonia at a temperature of at least about 150° C. for a sufficient period of time to effect a molecular condensation with loss of ammonia from the product, forming a substantially neutral product in which the atomic ratio of nitrogen to phosphorus is less than 1.5 to 1.

2. The method as set forth in claim 1, in which the heating is continued until the ratio of nitrogen to phosphorus is reduced to less than 1.25.

3. The method as set forth in claim 1, in which the reaction is carried out in an inert liquid dispersing medium.

4. The method as set forth in claim 1 in which the reaction mixture is heated at a temperature of about 150 to 200° C. for a period of about one to three hours.

5. A substantially neutral compound consisting of a nitrogen-phosphorus complex, resulting from heating a reaction product of $P_2O_5$ and anhydrous ammonia at a temperature of at least about 150° C. in the presence of excess anhydrous ammonia to produce a condensation reaction in which ammonia is lost by the heated product, said compound having an atomic ratio of nitrogen to phosphorus of less than 1½ to 1 and containing no water of constitution.

6. A product as set forth in claim 5 in which the heating is continued until the ratio of nitrogen to phosphorus has been reduced as low as 1.25 to 1.

7. A product as set forth in claim 5 in which the time of heating is at least one hour and the product is a polymerized product.

8. An alkali metal salt of the compound set forth in claim 5.

9. A salt of the compound set forth in claim 5 having an acid radical consisting essentially of phosphoric oxide and nitrogen, the atomic ratio of nitrogen to phosphorus in the acid radical being less than 0.50.

10. A compound essentially of nitrogen-phosphorus complex resulting from heating a reaction product of $P_2O_5$ and anhydrous ammonia at a temperature of at least about 150° C. in the presence of anhydrous ammonia to produce a condensation reaction in which ammonia is lost by the heated product, the heating being continued until the product has an atomic ratio of nitrogen to phosphorus of 1.25 to 1 or less and has a calcium ion repression value of about 1.25.

11. A compound essentially of a nitrogen-phosphorus complex resulting from heating a reaction product of $P_2O_5$ and anhydrous ammonia at a temperature of at least about 150° C. in the presence of anhydrous ammonia to produce a condensation reaction in which ammonia is lost by the heated product, the heating being continued until the product has an atomic ratio of nitrogen to phosphorus of 1.25 to 1 or less and has a calcium ion repression value below 1.6.

12. A product as set forth in claim 11, in which there are both nuclear nitrogen atoms and at least one ammonium group, the molecular ratio of ammonium nitrogen to total nitrogen being above 0.6.

13. A product as set forth in claim 11, in which there are both nuclear nitrogen atoms and at least one ammonium group, the molecular ratio of ammonium nitrogen to total nitrogen being about 0.8.

14. A product as set forth in claim 11 in which the product has a pH value between 6 and 7 in a .25% aqueous solution.

15. As an article of manufacture, a nitrogen-phosphorus complex resulting from heating a reaction product of anhydrous ammonia and $P_2O_5$ in the presence of anhydrous ammonia at a temperature of about 150° C. to 200° C. for a period of the order of 1-3 hours and having a calcium ion repression value below 1.6.

16. The process of softening calcium or magnesium containing-water, which comprises adding thereto a compound essentially of a nitrogen-phosphorus complex resulting from heating a reaction product of $P_2O_5$ and anhydrous ammonia at a temperature of at least about 150° C. in the presence of anhydrous ammonia to produce a condensation reaction in which ammonia is lost by the heated product, the heating being continued until the product has an atomic ratio of nitrogen to phosphorus of 1.25 to 1 or less, and has a calcium ion repression value below 1.6.

17. A water-soft to soap and containing more than five parts per million of calcium or magnesium held in solution by a compound essentially of a nitrogen-phosphorus complex resulting from heating a reaction product of $P_2O_5$ and anhydrous ammonia at a temperature of at least about 150° C. in the presence of anhydrous ammonia to produce a condensation reaction in which ammonia is lost by the heated product, the heating being continued until the product has an atomic ratio of nitrogen to phosphorus of 1.25 to 1 or less, and has a calcium ion repression value below 1.6.

WILLARD H. WOODSTOCK.